United States Patent
Muta

(10) Patent No.: US 8,577,532 B2
(45) Date of Patent: Nov. 5, 2013

(54) VEHICLE, AND CONTROL METHOD AND CONTROL APPARATUS FOR VEHICLE

(75) Inventor: Koichiro Muta, Okazaki (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 13/395,760

(22) PCT Filed: Jan. 28, 2010

(86) PCT No.: PCT/JP2010/051080
§ 371 (c)(1),
(2), (4) Date: Mar. 13, 2012

(87) PCT Pub. No.: WO2011/092811
PCT Pub. Date: Aug. 4, 2011

(65) Prior Publication Data
US 2012/0303194 A1    Nov. 29, 2012

(51) Int. Cl.
*B60W 10/10* (2012.01)
(52) U.S. Cl.
USPC ............................................ 701/22; 180/338
(58) Field of Classification Search
USPC ............................................ 701/22; 180/338
See application file for complete search history.

(56) References Cited

U.S. PATENT DOCUMENTS

2006/0243501 A1* 11/2006 Hidaka ................... 180/65.1
2009/0149295 A1* 6/2009 Yamamoto et al. ......... 477/109

FOREIGN PATENT DOCUMENTS

| JP | A-2000-156901 | 6/2000 |
| JP | A-2006-306209 | 11/2006 |
| JP | A-2007-186004 | 7/2007 |
| JP | A-2007-331599 | 12/2007 |
| JP | A-2009-196474 | 9/2009 |

OTHER PUBLICATIONS

International Search Report issued in International Patent Application No. PCT/JP2010/051080 dated Mar. 2, 2010.

* cited by examiner

*Primary Examiner* — Mary Cheung
*Assistant Examiner* — Yuen Wong
(74) *Attorney, Agent, or Firm* — Oliff & Berridge, PLC

(57) ABSTRACT

A hybrid vehicle includes an engine, a second MG provided such that torque is transmitted between the second MG and a wheel, a brake system that applies braking force to the vehicle via friction force, and a control unit that controls the engine, the electric motor and the braking device. The control unit executes control for decelerating the vehicle through regenerative braking by the electric motor and braking by the braking device, executes control for either starting or stopping the engine, and due to execution of one control, restricts execution of the other control.

7 Claims, 21 Drawing Sheets

# VEHICLE, AND CONTROL METHOD AND CONTROL APPARATUS FOR VEHICLE

TECHNICAL FIELD

The present invention relates to a vehicle, and a control method and a control apparatus for the vehicle. Particularly, the present invention relates to a technique of controlling an engine and braking force in a hybrid vehicle equipped with the engine and an electric motor as driving sources.

BACKGROUND ART

A hybrid vehicle equipped with an engine and an electric motor as driving sources has been known. The hybrid vehicle can be decelerated through regenerative braking in which the electric motor converts kinetic energy to electrical energy. As described in Japanese Patent Laying-Open No. 2000-156901 (PTL 1), deceleration requested by a driver is obtained by cooperatively controlling regenerative braking and general braking by a braking device using frictional force.

CITATION LIST

Patent Literature

PTL 1: Japanese Patent Laying-Open No. 2000-156901

SUMMARY OF INVENTION

Technical Problem

For example, when the engine starts, the electric power consumption increases because the engine is cranked using a power generator and the like coupled to the engine. Therefore, when the engine starts during cooperative control over regenerative braking and braking by the braking device, regeneratively generated electric power may be increased so as to ensure electric power required for startup of the engine. Therefore, braking force generated as a result of regenerative braking may be increased. Furthermore, braking force generated by the braking device is reduced in accordance with the amount of increase in the braking force generated as a result of regenerative braking, so as to keep the braking force of the entire vehicle constant. Conversely, when the power generator and the like convert kinetic energy of the engine to electrical energy at the time of stopping the engine, electric power generated in the entire hybrid vehicle increases. Therefore, when the engine stops during cooperative control over regenerative braking and braking by the braking device, the regeneratively generated electric power may be decreased such that charging power for a battery and the like does not exceed an upper limit value. Therefore, the braking force generated as a result of regenerative braking may be decreased. Furthermore, the braking force generated by the braking device is increased in accordance with the amount of decrease in the braking force generated as a result of regenerative braking, so as to keep the braking force of the entire vehicle constant.

Responsiveness of regenerative braking by the electric motor is, however, different from responsiveness of braking by the braking device. Therefore, even when the braking force generated as a result of regenerative braking and the braking force generated by the braking device are simultaneously changed such that fluctuations in the braking force generated by the braking device offset fluctuations in the braking force generated as a result of regenerative braking, the obtained braking force of the entire vehicle may fluctuate. As a result, the behavior of the vehicle may be disturbed.

An object of the present invention is to stabilize the behavior of the vehicle.

Solution to Problem

A vehicle includes: an engine; an electric motor provided such that torque is transmitted between the electric motor and a wheel; a braking device that applies braking force to the vehicle via friction force; and a control unit that controls the engine, the electric motor and the braking device. The control unit executes first control for decelerating the vehicle through regenerative braking by the electric motor and braking by the braking device, executes second control for either starting or stopping the engine, and due to execution of one control of the first control and the second control, restricts execution of the other control.

Advantageous Effects of Invention

Due to execution of one control, execution of the other control is restricted. Thus, simultaneous execution of both control can be restricted. Therefore, fluctuations in the braking force generated as a result of regenerative braking and the braking force generated by the braking device due to startup or stop of the engine can be prevented. In addition, before starting or stopping the engine, the braking force generated as a result of regenerative braking can be changed such that fluctuations in the braking force generated by the braking device can offset fluctuations in the braking force generated as a result of regenerative braking. As a result, the amount of fluctuations in the obtained braking force of the entire vehicle can be decreased and the behavior of the vehicle can be stabilized.

DESCRIPTION OF EMBODIMENTS

Figure 1:
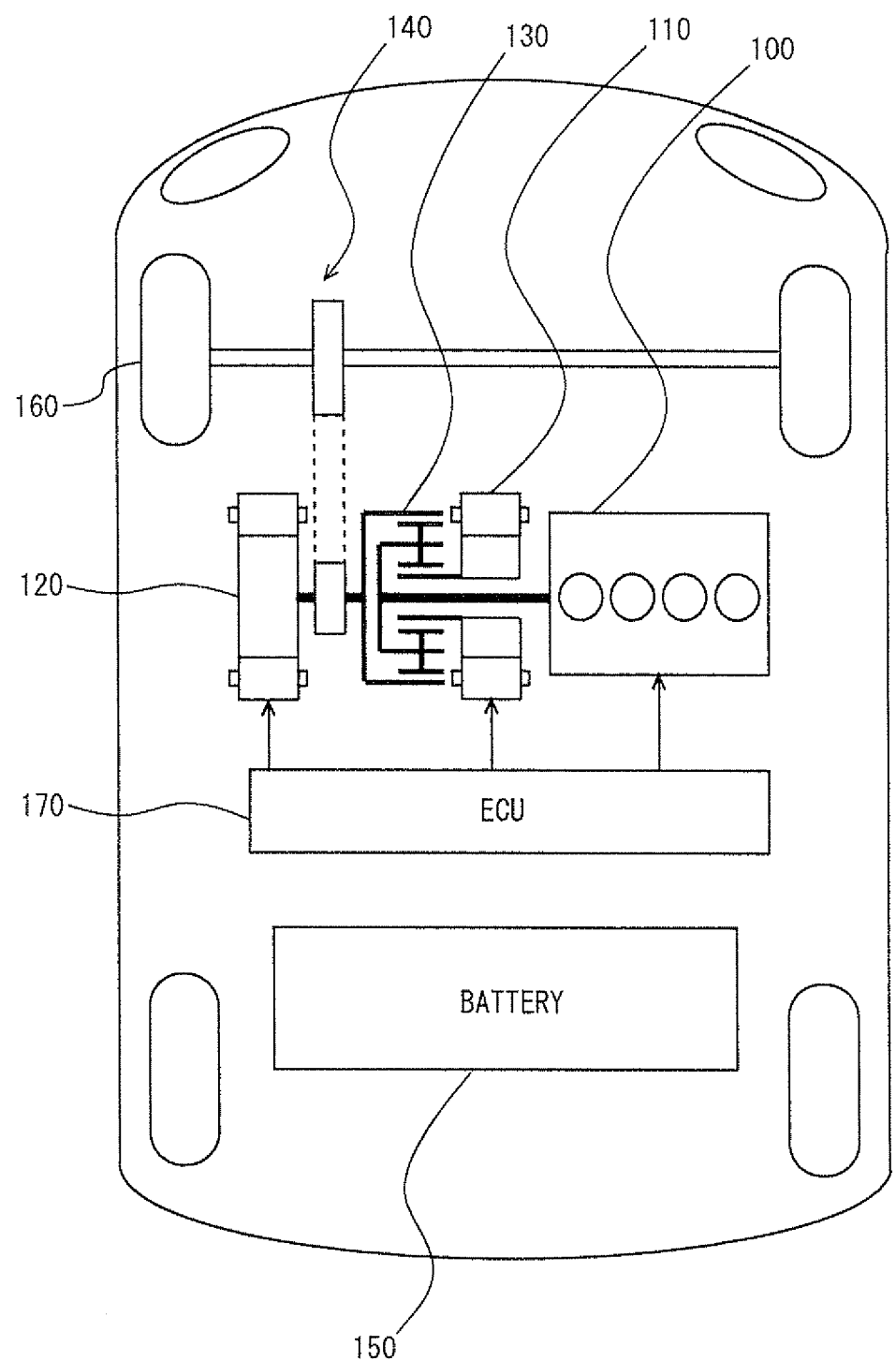
FIG. 1 is a schematic configuration diagram showing a hybrid vehicle.

Referring to figures, embodiments of the present invention will be described below. In the description below, the same components are given the same reference characters. Their names and functions are also the same. Hence, they will not be described in detail repeatedly.

First Embodiment

Referring to FIG. 1, a hybrid vehicle includes an engine 100, a first MG (Motor Generator) 110, a second MG 120, a power split device 130, a speed reducer 140, and a battery 150.

The vehicle travels using driving power provided from at least one of engine 100 and second MG 120. It should be noted that a series-type hybrid vehicle that travels using driving power provided only from second MG 120 may be used.

Engine 100, first MG 110 and second MG 120 are connected to one another via power split device 130. Motive power generated by engine 100 is split by power split device 130 into two paths. One of them is a path for driving front wheels 160 via speed reducer 140. The other is a path for driving first MG 110 to generate electric power.

First MG 110 is a three-phase alternating current rotating electric machine including a U-phase coil, a V-phase coil and a W-phase coil. First MG 110 generates electric power using the motive power generated by engine 100 and split by power split device 130. The electric power generated by first MG 110 is used depending on a traveling state of the vehicle and a state of SOC (State Of Charge) of battery 150. For example, during normal traveling, the electric power generated by first MG 110 is used directly as electric power for driving second MG 120. On the other hand, when the SOC of battery 150 is lower than a predetermined value, the electric power generated by first MG 110 is converted by an inverter described below from alternating-current power to direct-current power. Thereafter, a converter described below adjusts a voltage thereof and the electric power is stored in battery 150.

When first MG 110 serves as a power generator, first MG 110 generates negative torque. The negative torque used herein refers to torque serving as a load for engine 100. When first MG 110 is supplied with electric power to serve as a motor, first MG 110 generates positive torque. The positive torque used herein refers to torque not serving as a load for engine 100, i.e., torque assisting rotation of engine 100. The same holds true for second MG 120.

In the present embodiment, when control for starting engine 100 is executed, first MG 110 serves as a motor. Engine 100 is cranked by first MG 110. When control for stopping engine 100 is executed, first MG 110 serves as a power generator to generate the negative torque. In control for stopping engine 100 with first MG 110, first MG 110 is controlled such that a crank angle is set to a predetermined angle.

Second MG 120 is a three-phase alternating current rotating electric machine including a U-phase coil, a V-phase coil and a W-phase coil. Second MG 120 is driven using at least one of the electric power stored in battery 150 and the electric power generated by first MG 110.

Second MG 120 is provided such that torque is transmitted between second MG 120 and the wheels. The torque generated by second MG 120 is transmitted to front wheels 160 via speed reducer 140. In this way, second MG 120 assists engine 100, or causes the vehicle to travel using the torque provided from second MG 120. Instead of or in addition to front wheels 160, rear wheels may be driven.

Upon regenerative braking of the hybrid vehicle, front wheels 160 drive second MG 120 through speed reducer 140 and second MG 120 operates as a power generator. In this way, second MG 120 operates as a regenerative brake to convert the braking energy to electric power. The electric power thus generated by second MG 120 is stored in battery 150.

Power split device 130 is constituted by a planetary gear including a sun gear, a pinion gear, a carrier, and a ring gear. The pinion gear engages with the sun gear and the ring gear. The carrier rotatably supports the pinion gear. The sun gear is coupled to the rotation shaft of first MG 110. The carrier is coupled to the crankshaft of engine 100. The ring gear is coupled to the rotation shaft of second MG 120 and speed reducer 140.

Figure 2:
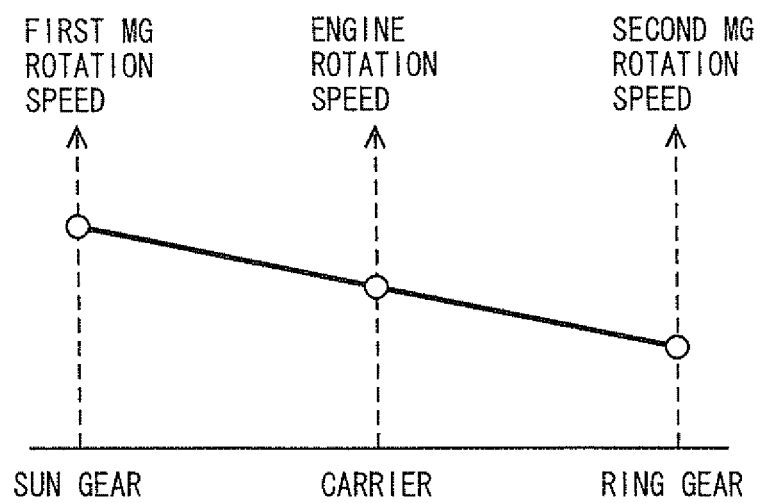
FIG. 2 shows a nomographic chart of a power split device.

Since engine 100, first MG 110 and second MG 120 are coupled to one another through power split device 130 constituted by the planetary gear, the rotation speeds of engine 100, first MG 110 and second MG 120 are in such a relation that they are connected by a straight line in a nomographic chart as shown in FIG. 2.

Figure 3:
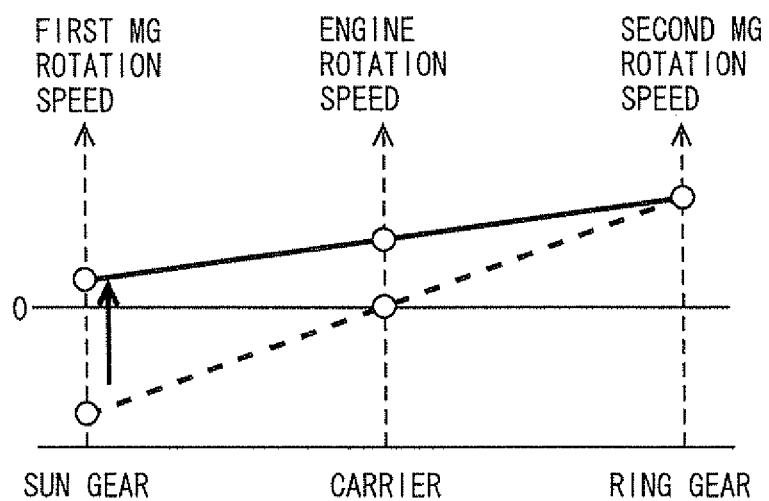
FIG. 3 shows a nomographic chart when control for starting an engine is executed.
Figure 4:
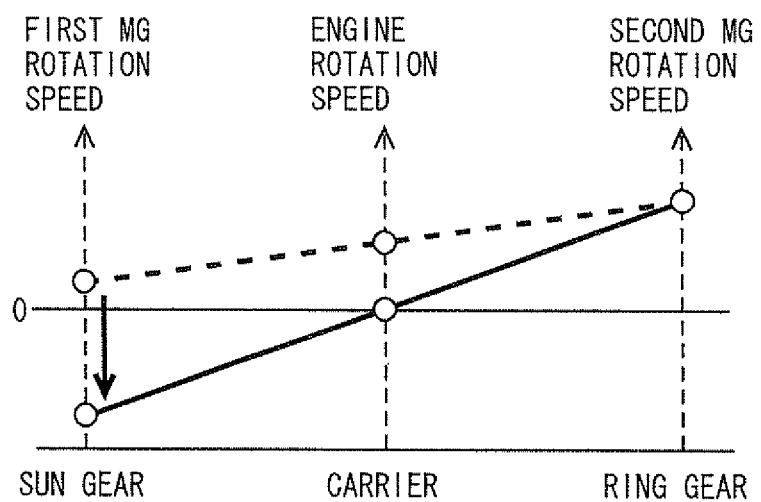
FIG. 4 shows a nomographic chart when control for stopping the engine is executed.

When control for starting engine 100 is executed, the rotation speed of engine 100 is increased due to first MG 110 as shown in FIG. 3. When control for stopping engine 100 is executed such that the crank angle is set to a predetermined angle, first MG 110 serves as a power generator to decrease the rotation speed of engine 100 as shown in FIG. 4. It should be noted that first MG 110 may generate electric power during a time period from when control for stopping engine 100 starts to when engine 100 stops. Battery 150 is charged with the electric power generated by first MG 110.

Referring to FIG. 1 again, battery 150 is a battery pack constituted by a plurality of battery modules connected in series and each having a plurality of battery cells incorporated therein. Battery 150 has a voltage of, for example, approximately 200 V. Battery 150 is charged with electric power supplied from first MG 110 and second MG 120.

Charging power for battery 150 is controlled to be equal to or smaller than a charging power limit value Win. Charging power limit value Win is an upper limit value of the charging power defined based on parameters including the SOC, the temperature and the like of battery 150.

Engine 100, first MG 110 and second MG 120 are controlled by an ECU (Electronic Control Unit) 170. ECU 170 may be divided into a plurality of ECUs.

Figure 5:
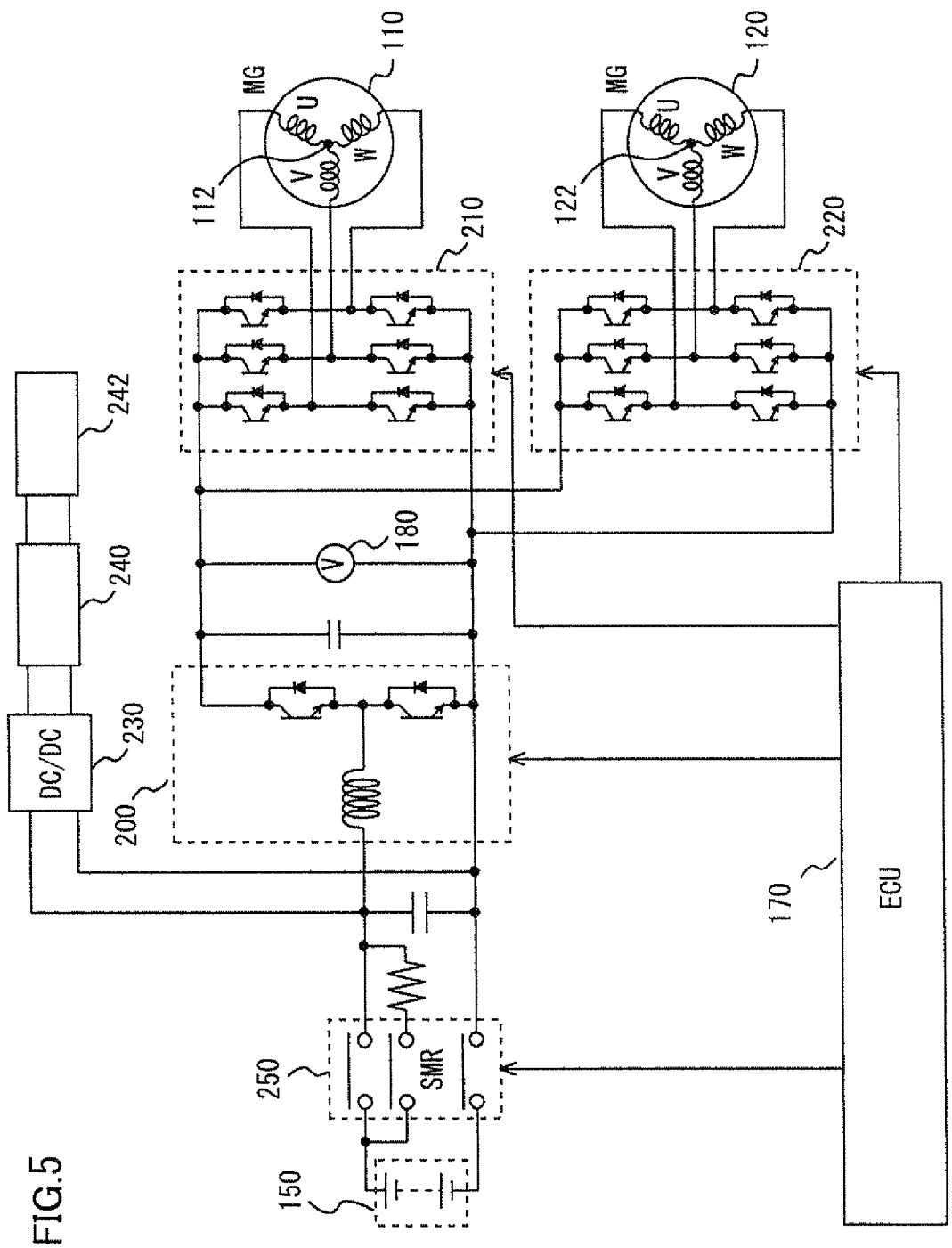
FIG. 5 shows an electrical system of the hybrid vehicle.

Referring to FIG. 5, an electrical system of the hybrid vehicle will be further described. The hybrid vehicle is provided with a converter 200, a first inverter 210, a second inverter 220, a DC/DC converter 230, an auxiliary battery 240, and an SMR (System Main Relay) 250.

Converter 200 includes a reactor, two npn-type transistors and two diodes. The reactor has one end connected to the positive electrode side of battery 150, and has the other end connected to the connection point of the two npn-type transistors.

The two npn-type transistors are connected in series. The npn-type transistors are controlled by ECU 170. Between the collector and the emitter of each npn-type transistor, a diode is connected to allow a current to flow from the emitter side to the collector side.

As the npn-type transistor, for example, an IGBT (Insulated Gate Bipolar Transistor) can be used. Instead of the npn-type transistor, a power switching element such as a power MOSFET (Metal Oxide Semiconductor Field-Effect Transistor) can be used.

When supplying first MG 110 or second MG 120 with electric power discharged from battery 150, converter 200 boosts the voltage thereof. In contrast, when charging battery 150 with electric power generated by first MG 110 or second MG 120, converter 200 steps down the voltage thereof.

A voltmeter 180 detects a system voltage VH among converter 200, first inverter 210 and second inverter 220. A result of detection by voltmeter 180 is sent to ECU 170.

First inverter 210 includes a U-phase arm, a V-phase arm and a W-phase arm. The U-phase arm, the V-phase arm and the W-phase arm are connected in parallel. Each, of the U-phase arm, the V-phase arm and the W-phase arm has two npn-type transistors connected in series. Between the collector and the emitter of each npn-type transistor, a diode is connected to allow a current to flow from the emitter side to the collector side. The connection points of the npn-type transistors of each arm are respectively connected to ends different from a neutral point 112 in each coil of first MG 110.

First inverter 210 converts a direct current supplied from battery 150 into an alternating current, and supplies it to first MG 110. Also, first inverter 210 converts an alternating current generated by first MG 110 into a direct current.

Second inverter 220 includes a U-phase arm, a V-phase arm and a W-phase arm. The U-phase arm, the V-phase arm and the W-phase arm are connected in parallel. Each of the U-phase arm, the V-phase arm and the W-phase arm has two npn-type transistors connected in series. Between the collector and the emitter of each npn-type transistor, a diode is connected to allow a current to flow from the emitter side to the collector side. The connection points of the npn-type transistors of each arm are respectively connected to ends different from a neutral point 122 in each coil of second MG 120.

Second inverter 220 converts a direct current supplied from battery 150 into an alternating current, and supplies it to second MG 120. Also, second inverter 220 converts an alternating current generated by second MG 120 into a direct current.

DC/DC converter 230 is connected between battery 150 and converter 200 in parallel with converter 200. DC/DC converter 230 steps down a direct-current voltage. DC/DC converter 230 outputs electric power, which is charged to auxiliary battery 240. The electric power thus charged to auxiliary battery 240 is supplied to an auxiliary device 242 such as an electrically driven oil pump, and ECU 170.

SMR (System Main Relay) 250 is provided between battery 150 and DC/DC converter 230. SMR 250 is a relay for switching between a state in which battery 150 and the electrical system are connected to each other and a state in which they are disconnected from each other. When SMR 250 is in the open state, battery 150 is disconnected from the electrical system. When SMR 250 is in the closed state, battery 150 is connected to the electrical system.

Namely, when SMR 250 is in the open state, battery 150 is electrically disconnected from DC/DC converter 230, auxiliary battery 240, auxiliary device 242, ECU 170, and the like. When SMR 250 is in the closed state, electric power can be supplied from battery 150 to DC/DC converter 230, auxiliary battery 240, auxiliary device 242, ECU 170, and the like.

Figure 6:
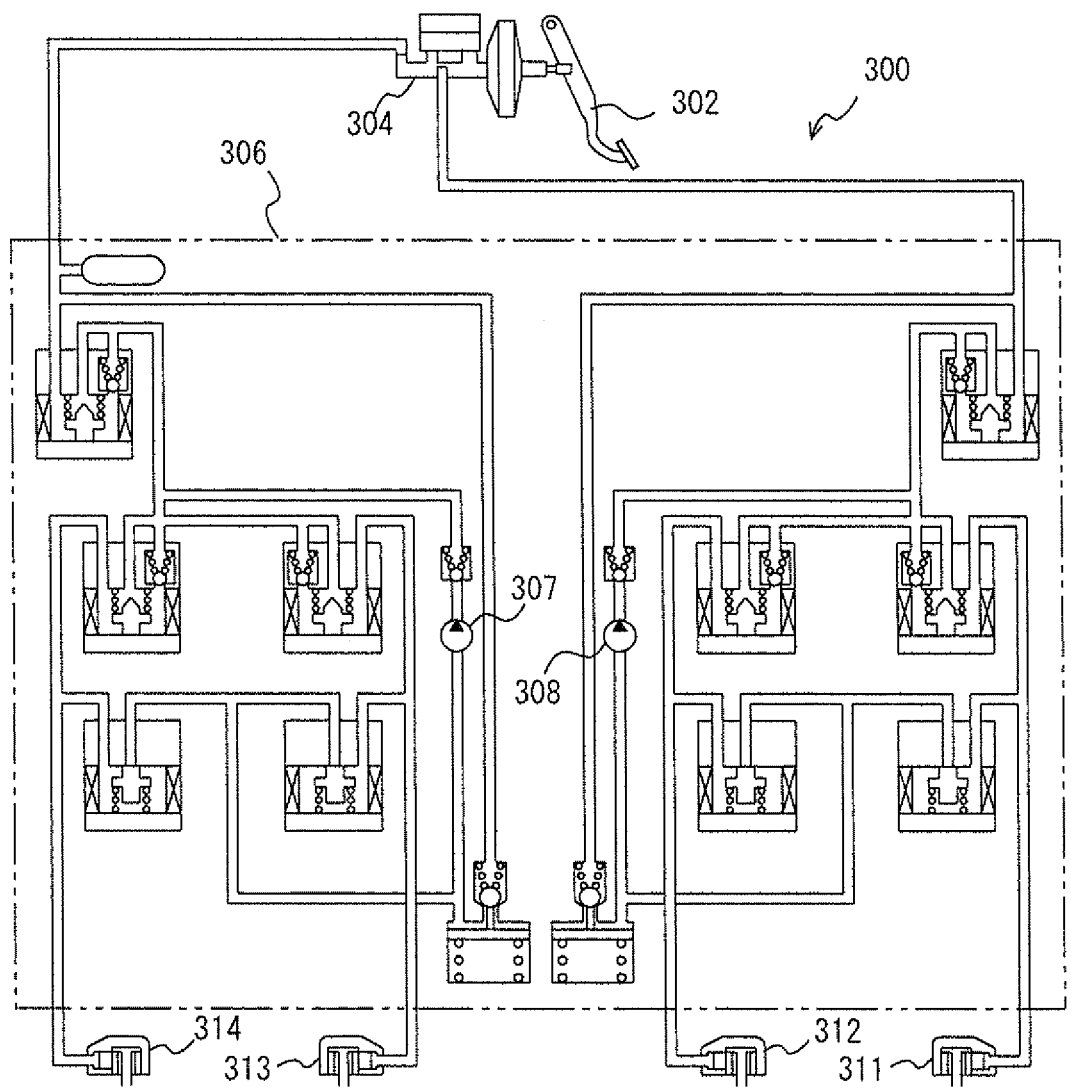
FIG. 6 shows a brake system.

Referring to FIG. 6, a brake system 300 that applies braking force to the hybrid vehicle will be described. A brake pedal 302 is coupled to a master cylinder 304. When brake pedal 302 is operated, hydraulic pressure corresponding to the amount of operation of the brake is generated at master cylinder 304.

The hydraulic pressure generated at master cylinder 304 is supplied to calipers 311 to 314 provided at respective wheels via a brake actuator 306 controlled by ECU 170. In other words, when brake pedal 302 is operated, brake actuator 306 is controlled such that the hydraulic pressure generated at master cylinder 304 is supplied to calipers 311 to 314. Supply of the hydraulic pressure to calipers 311 to 314 causes a brake pad to be pressed against a disc rotor. The braking force is applied to the vehicle via friction force between the brake pad and the disc rotor.

Calipers 311 to 314 are supplied with hydraulic pressure generated at brake actuator 306, in addition to the hydraulic pressure corresponding to the amount of operation of brake pedal 302. Brake actuator 306 includes a solenoid valve and pumps 307 and 308.

By controlling opening and closing of the solenoid valve, hydraulic pressure generated at pumps 307 and 308 is supplied to calipers 311 to 314 or is discharged from calipers 311 to 314. As a result, brake hydraulic pressure, i.e., braking force generated by brake system 300 is controlled. The amount of actuation of calipers 311 to 314 corresponds to the hydraulic pressure. It should be noted that electrically-actuated calipers may be provided instead of the hydraulically-actuated calipers. A drum brake may be used instead of a disc brake.

Figure 7:
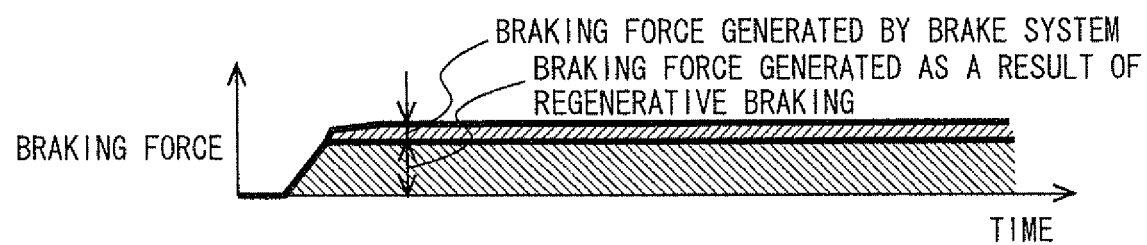
FIG. 7 shows braking force.

Braking by brake system 300 is executed to cooperate with regenerative braking by second MG 120. In other words, in the present embodiment, control for decelerating the vehicle through regenerative braking by second MG 120 and braking by brake system 300 is executed. As shown in FIG. 7, the braking force generated by second MG 120 and the braking force generated by brake system 300 cooperate with each other such that the braking force generated by brake system 300 makes up a shortfall in the braking force generated as a result of regenerative braking with respect to the braking force requested by the driver, i.e., the braking force defined in accordance with the amount of stepping on brake pedal 302. When only the braking force generated as a result of regenerative braking satisfies the braking force requested by the driver, the braking force generated by brake system 300 is set to zero.

The braking force generated as a result of regenerative braking, i.e., the regeneratively generated electric power is defined in accordance with the vehicle speed, the SOC of battery 150 and the like. The regeneratively generated electric power is controlled to be equal to or smaller than charging power limit value Win.

Figure 8:
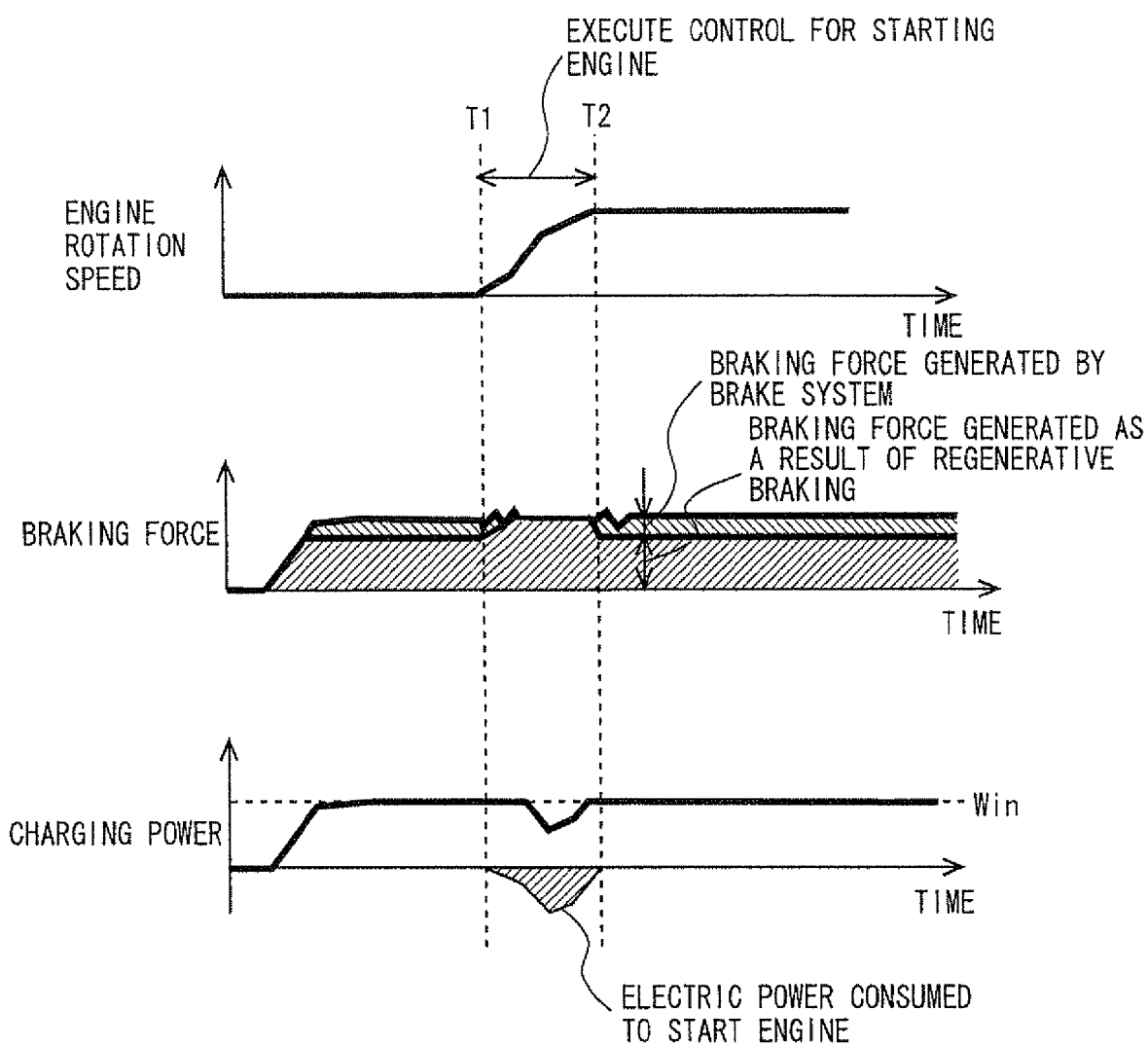
FIG. 8 shows a change in the braking force when control for starting the engine is executed.

As shown in FIG. 8, when engine 100 starts during execution of control for decelerating the vehicle through regenerative braking by second MG 120 and braking by brake system 300, first MG 110 consumes electric power to crank engine 100. The regeneratively generated electric power may be increased so as to ensure the electric power for cranking engine 100. Therefore, the braking force generated as a result of regenerative braking may be increased. Furthermore, the braking force generated by brake system 300 may be reduced in accordance with the amount of increase in the braking force generated as a result of regenerative braking, so as to keep the obtained braking force of the entire vehicle constant.

Figure 9:
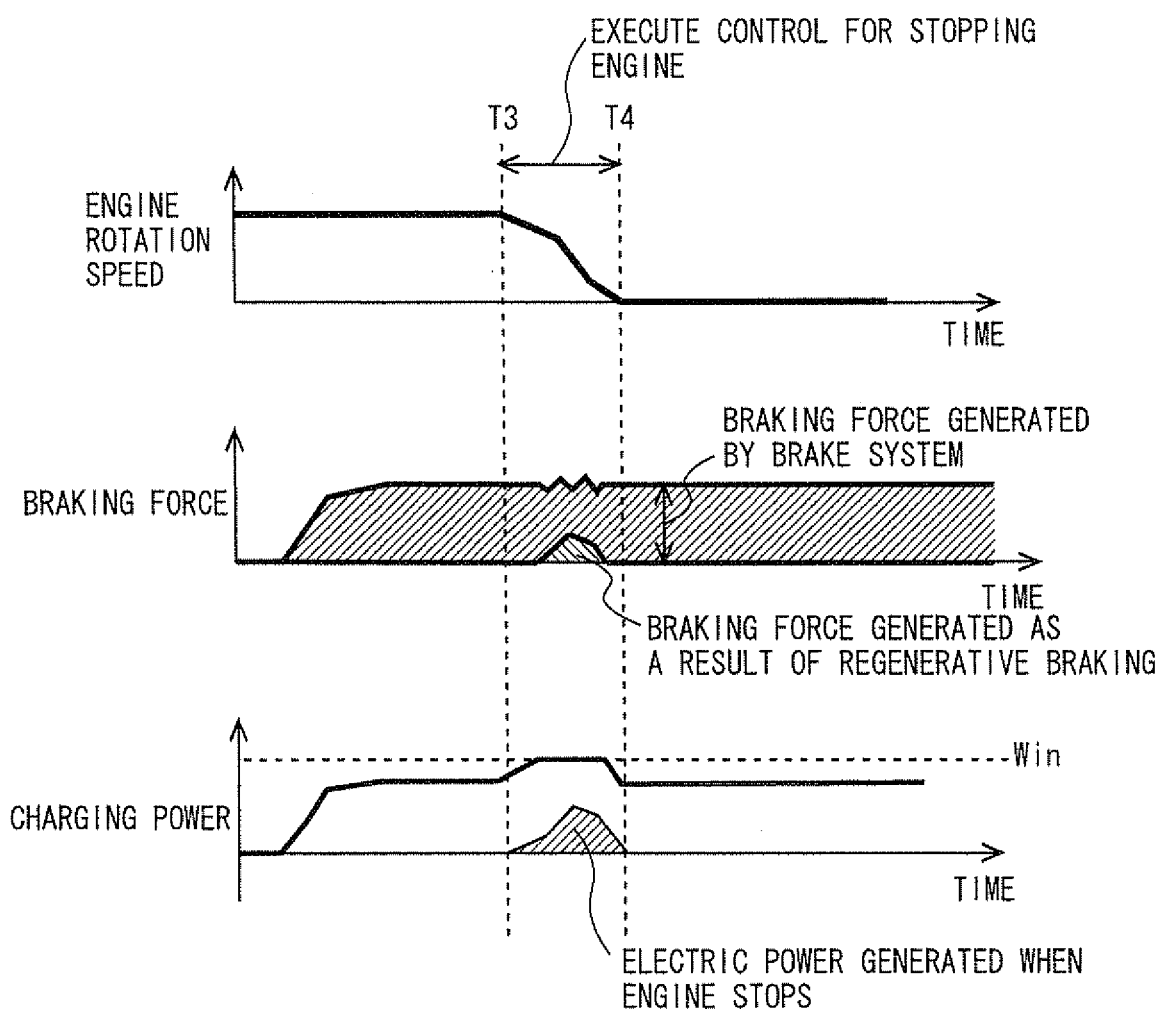
FIG. 9 shows a change in the braking force when control for stopping the engine is executed.

On the other hand, as shown in FIG. 9, when engine 100 stops during execution of control for decelerating the vehicle through regenerative braking by second MG 120 and braking by brake system 300, the regeneratively generated electric power may be decreased in accordance with the electric power generated by first MG 110 such that the charging power for battery 150 does not exceed the upper limit value. Therefore, the braking force generated as a result of regenerative braking may be decreased. Furthermore, the braking force generated by brake system 300 may be reduced in accordance with the amount of increase in the braking force generated as a result of regenerative braking, so as to keep the braking force of the entire vehicle constant.

Responsiveness of regenerative braking by second MG 120 is, however, different from responsiveness of braking by brake system 300 using the hydraulic pressure. Therefore, as shown in FIGS. 8 and 9, the braking force of the entire vehicle may fluctuate during T1 to T2 or T3 to T4 in which control for starting or stopping engine 100 is being executed. As a result, the behavior of the vehicle may be disturbed.

Thus, in the present embodiment, execution of control for starting or stopping engine 100 is restricted during execution of control for decelerating the vehicle through regenerative braking by second MG 120 and braking by brake system 300 as described below.

Figure 10:
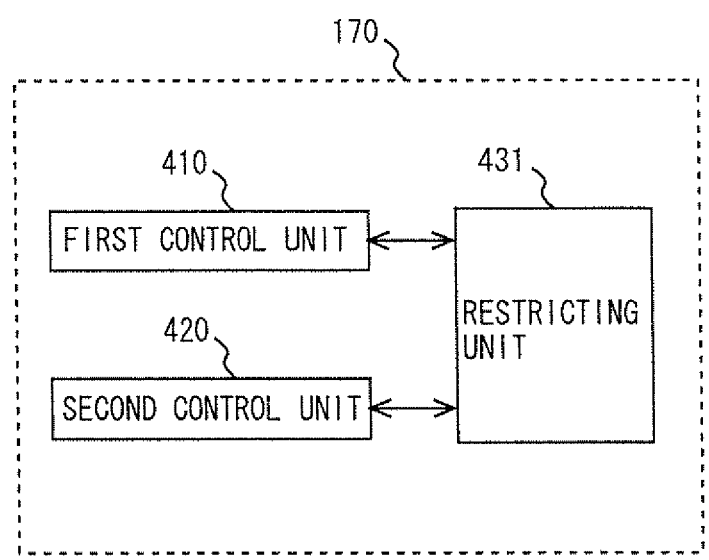
FIG. 10 is a functional block diagram of an ECU in a first embodiment.

Referring to FIG. 10, functions of ECU 170 will be described. It should be noted that the functions described below may be implemented by software or may be implemented by hardware.

ECU 170 includes a first control unit 410, a second control unit 420 and a restricting unit 431. First control unit 410 executes control for decelerating the vehicle through regenerative braking by second MG 120 and braking by brake system 300. More specifically, the braking force generated by second MG 120 and the braking force generated by brake system 300 cooperate with each other such that the braking force generated by brake system 300 makes up a shortfall in the braking force generated as a result of regenerative braking with respect to the braking force requested by the driver, i.e., the braking force defined in accordance with the amount of stepping on brake pedal 302.

Second control unit 420 executes control for either starting or stopping engine 100. When control for starting engine 100 is executed, engine 100 is cranked by first MG 110. As a result, the rotation speed of engine 100 is increased due to first MG 110. When control for stopping engine 100 is executed, first MG 110 serves as a power generator to decrease the rotation speed of engine 100.

Figure 11:
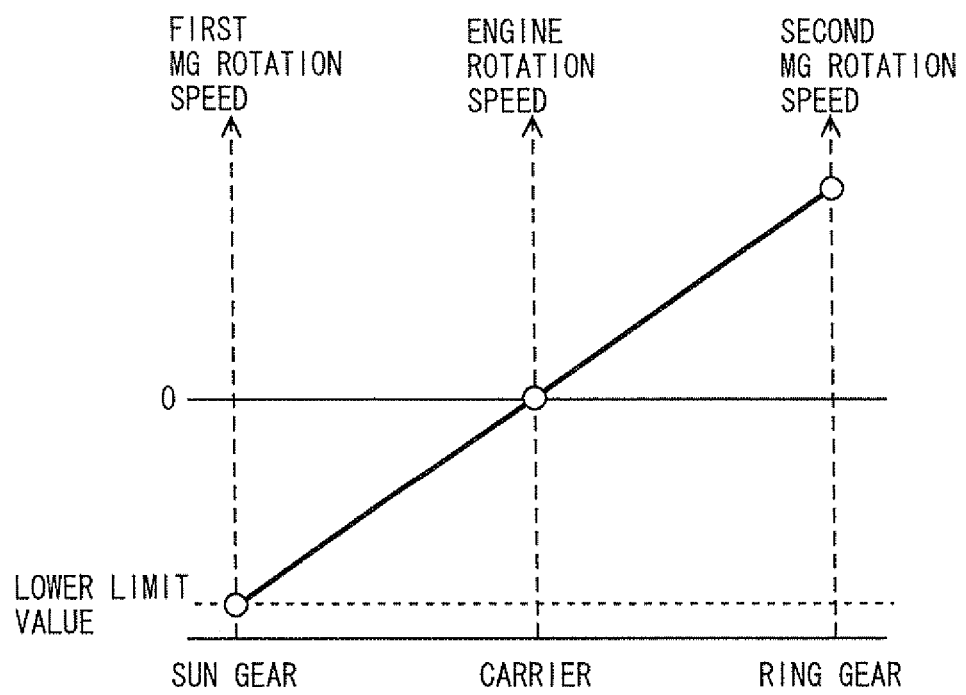
FIG. 11 shows one example of a condition for requesting startup of the engine.

For example, as shown in FIG. 11, when the condition that the rotation speed of first MG 110 becomes equal to or smaller than a lower limit value is satisfied, control for starting engine 100 is executed. In addition, for example, when the condition that the vehicle speed becomes equal to or larger than a threshold value is satisfied, when the condition that power outputtable by second MG 120 is lower than target power defined in accordance with the accelerator opening degree is satisfied, when the condition that heating of the hybrid vehicle is turned on and the water temperature of engine 100 is lower than a threshold value is satisfied, when the necessity for warming up a catalyst is determined, and when the condition that the SOC of battery 150 becomes equal to or smaller than a threshold value is satisfied, control for starting engine 100 is executed.

Figure 12:
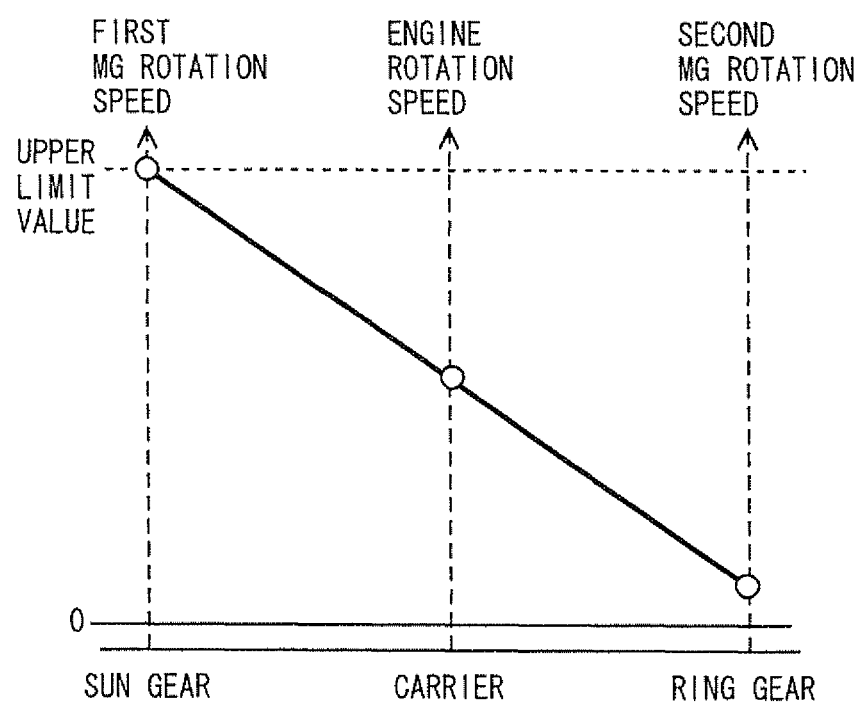
FIG. 12 shows one example of a condition for requesting stop of the engine.

On the other hand, as shown in FIG. 12, when the condition that the rotation speed of first MG 110 becomes equal to or larger than an upper limit value is satisfied, control for stopping engine 100 is executed. In addition, for example, when the condition that the vehicle has stopped is satisfied, and when the condition that the power outputtable by second MG 120 is higher than the target power defined in accordance with the accelerator opening degree is satisfied, control for stopping engine 100 is executed.

It should be noted that the conditions for executing control for starting engine 100 and the conditions for executing control for stopping engine 100 are not limited thereto. The conditions for executing control for starting engine 100 and the conditions for executing control for stopping engine 100 are defined as appropriate in consideration of matters required for the hybrid vehicle.

Referring to FIG. 10 again, due to execution of one control of control by first control unit 410 and control by second control unit 420, restricting unit 431 restricts execution of the other control. In the present embodiment, during execution of control by first control unit 410, execution of control by second control unit 420 is prohibited. In other words, during execution of control for decelerating the vehicle through regenerative braking by second MG 120 and braking by brake system 300, execution of control for starting or stopping engine 100 is prohibited.

Figure 13:
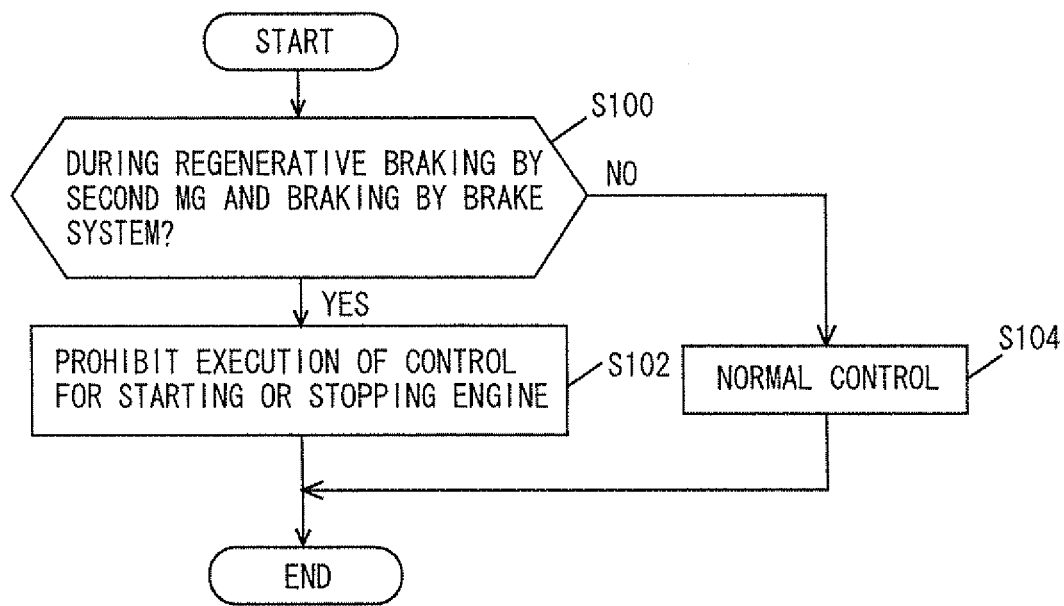
FIG. 13 is a flowchart showing a control structure of the ECU in the first embodiment.

Referring to FIG. 13, a process executed by ECU 170 will be described. It should be noted that the process described below is repeatedly executed at a predetermined cycle.

In step (hereinafter, the term "step" is abbreviated as "S") 100, ECU 170 determines whether or not control for decelerating the vehicle through regenerative braking by second MG 120 and braking by brake system 300 is being executed. If control for decelerating the vehicle through regenerative braking by second MG 120 and braking by brake system 300 is being executed (YES in S100), the process proceeds to S102. If not (NO in S100), the process proceeds to S104.

In S102, ECU 170 prohibits control for either starting or stopping engine 100. In S104, ECU 170 executes normal control. In other words, ECU 170 permits control for either starting or stopping engine 100. Therefore, when a predetermined condition is satisfied, engine 100 starts or stops.

As described above, in the present embodiment, during execution of control for decelerating the vehicle through regenerative braking by second MG 120 and braking by brake system 300, execution of control for starting or stopping engine 100 is prohibited. As a result, fluctuations in the braking force caused by startup or stop of engine 100 can be prevented. Therefore, the behavior of the vehicle can be stabilized.

Second Embodiment

A second embodiment will be described hereinafter. In the present embodiment, during execution of control for decelerating the vehicle through regenerative braking by second MG 120 and braking by brake system 300, execution of control for starting or stopping engine 100 based on a low-priority request is restricted.

Figure 14:
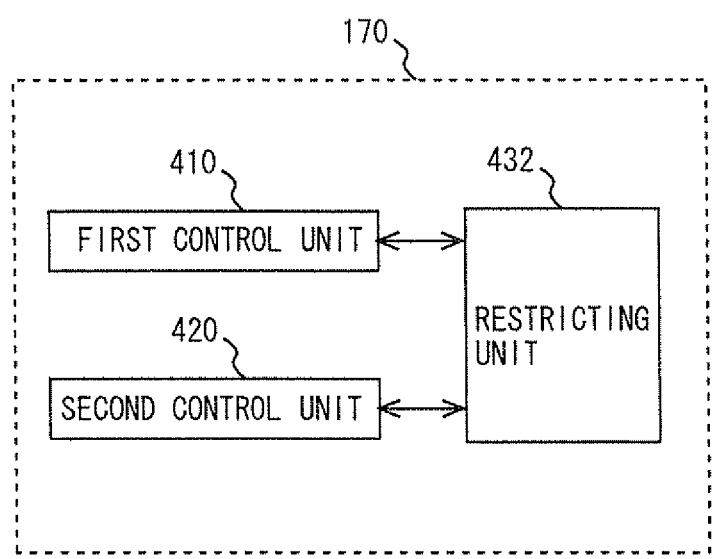
FIG. 14 is a functional block diagram of the ECU in a second embodiment.

Referring to FIG. 14, functions of ECU 170 will be described. It should be noted that the functions described below may be implemented by software or may be implemented by hardware. First control unit 410 and second control unit 420 are the same as those in the first embodiment described above, and thus, they will not be described in detail repeatedly here.

Due to execution of one control of control by first control unit 410 and control by second control unit 420, a restricting unit 432 restricts execution of the other control. In the present embodiment, when a first condition for executing control by second control unit 420 is satisfied during execution of control by first control unit 410, execution of control by second control unit 420 is prohibited. In other words, when the first condition is satisfied during execution of control for decelerating the vehicle through regenerative braking by second MG 120 and braking by brake system 300, execution of control for starting or stopping engine 100 is prohibited.

On the other hand, when a second condition for executing control by second control unit 420, which is different from the first condition, is satisfied during execution of control by first control unit 410, control by second control unit 420 is executed. In other words, when the second condition is satisfied during execution of control for decelerating the vehicle through regenerative braking by second MG 120 and braking by brake system 300, control for starting or stopping engine 100 is executed.

The priority of the first condition is set to be lower than the priority of the second condition. The first condition includes, for example, a condition defined to request startup of engine 100 to ensure the hybrid vehicle heating capability, and a condition defined to request stop of engine 100 to increase the fuel economy. More specifically, the first condition includes the condition that heating of the hybrid vehicle is turned on and the water temperature of engine 100 is lower than the threshold value, the condition that the vehicle has stopped, the condition that the power outputtable by second MG 120 is higher than the target power defined in accordance with the accelerator opening degree, and other conditions. It should be noted that the first condition is not limited thereto.

The second condition includes, for example, a condition defined to request startup or stop of engine 100 to protect components (to prevent excessive rotation of first MG 110), and a condition defined to request startup of engine 100 to ensure driving power of the vehicle. More specifically, the second condition includes the condition that the rotation speed of first MG 110 becomes equal to or smaller than the lower limit value, the condition that the power outputtable by second MG 120 is lower than the target power defined in accordance with the accelerator opening degree, and the condition that the rotation speed of first MG 110 becomes equal to or larger than the upper limit value. It should be noted that the second condition is not limited thereto.

Figure 15:
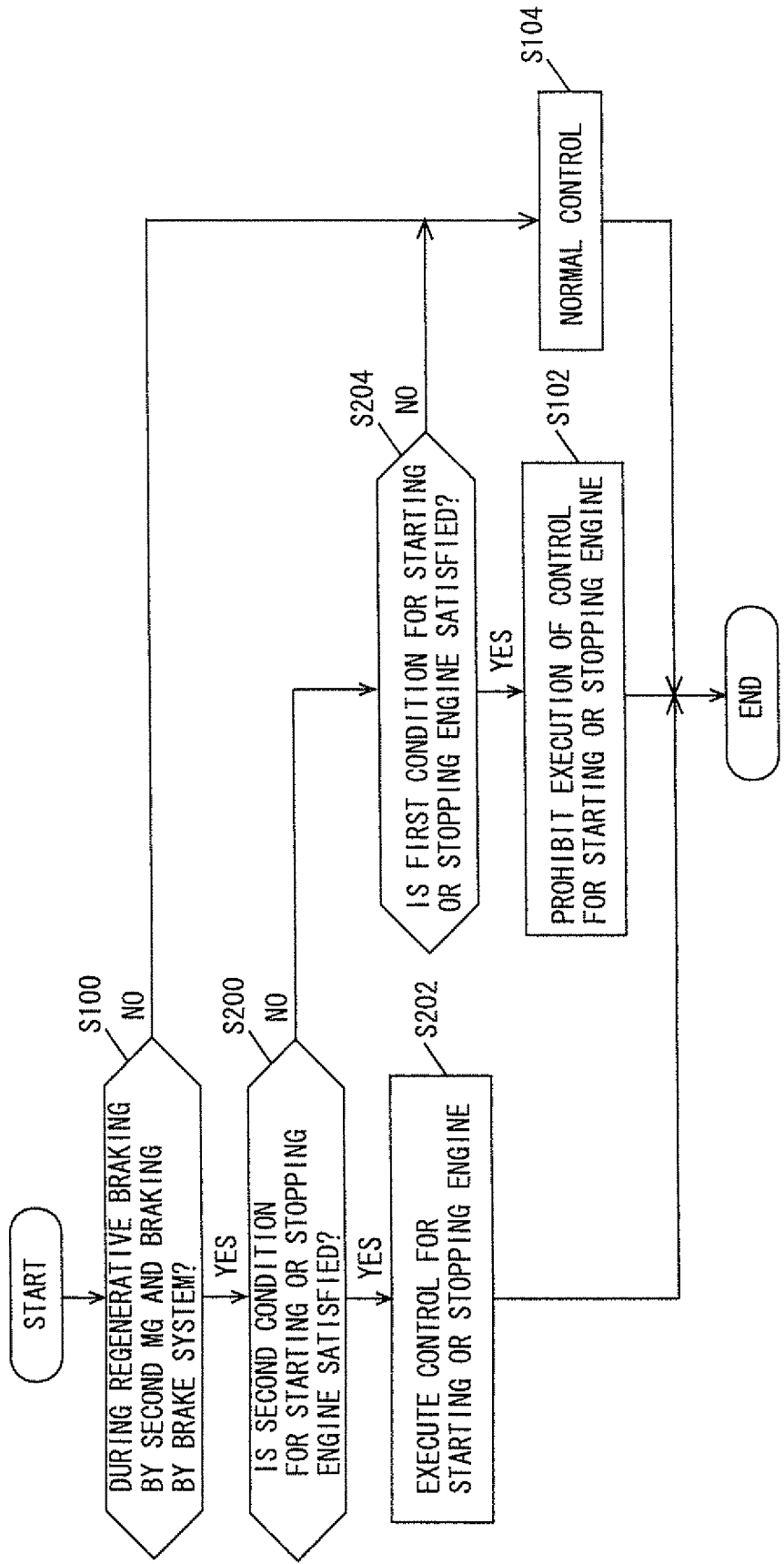
FIG. 15 is a flowchart showing a control structure of the ECU in the second embodiment.

Referring to FIG. 15, a process by ECU 170 will be described. It should be noted that the process described below is repeatedly executed at a predetermined cycle. The same steps as those in the first embodiment are denoted by the same step numbers, and thus, they will not be described in detail repeatedly here.

In S200, ECU 170 determines whether or not the second condition for starting or stopping engine 100 is satisfied. If the second condition is satisfied (YES in S200), the process proceeds to S202. If not (NO in S200), the process proceeds to S204.

In S202, ECU 170 executes control for either starting or stopping engine 100. When the condition for starting engine 100 is satisfied, control for starting engine 100 is executed. When the condition for stopping engine 100 is satisfied, control for stopping engine 100 is executed.

In S204, ECU 170 determines whether or not the first condition for starting or stopping engine 100 is satisfied. If the first condition is satisfied (YES in S204), the process proceeds to S102. If not (NO in S204), this process ends.

As described above, in the present embodiment, during execution of control for decelerating the vehicle through regenerative braking by second MG 120 and braking by brake system 300, execution of control for starting or stopping engine 100 based on a low-priority request is prohibited. As a result, fluctuations in the braking force caused by startup or stop of engine 100 can be prevented. Therefore, the behavior of the vehicle can be stabilized. On the other hand, even during execution of control for decelerating the vehicle through regenerative braking by second MG 120 and braking by brake system 300, control for starting or stopping engine 100 based on a high-priority request is executed. As a result, high-priority control can be reliably executed.

Third Embodiment

A third embodiment will be described hereinafter. In the present embodiment, when the braking force generated as a result of regenerative braking is equal to or larger than a predetermined value during execution of control for decelerating the vehicle through regenerative braking by second MG 120 and braking by brake system 300, execution of control for starting or stopping engine 100 is restricted.

Figure 16:
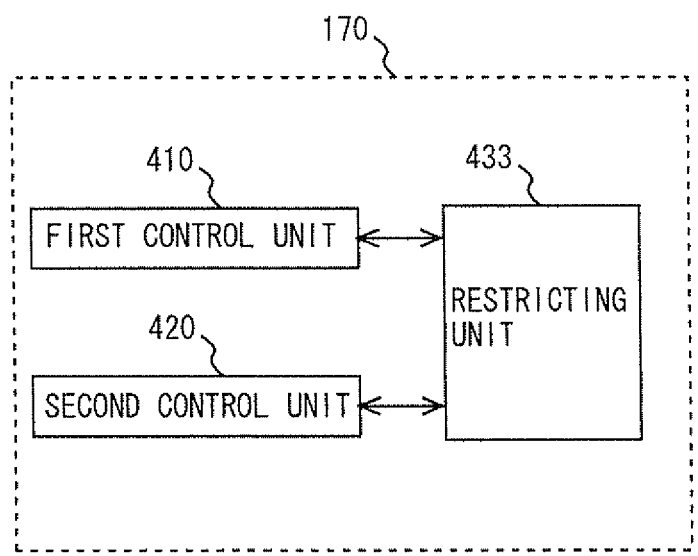
FIG. 16 is a functional block diagram of the ECU in a third embodiment.

Referring to FIG. 16, functions of ECU 170 will be described. It should be noted that the functions described below may be implemented by software or may be implemented by hardware. First control unit 410 and second control unit 420 are the same as those in the first embodiment described above, and thus, they will not be described in detail repeatedly here.

Due to execution of one control of control by first control unit 410 and control by second control unit 420, a restricting unit 433 restricts execution of the other control. In the present embodiment, when the braking force generated as a result of regenerative braking by second MG 120 is equal to or larger than the predetermined value during execution of control by first control unit 410, execution of control by second control unit 420 is prohibited. In other words, when the braking force generated as a result of regenerative braking by second MG 120 is equal to or larger than the predetermined value during execution of control for decelerating the vehicle through regenerative braking by second MG 120 and braking by brake system 300, execution of control for starting or stopping engine 100 is prohibited. More specifically, execution of control for stopping engine 100 is prohibited.

For example, when the regeneratively generated electric power is equal to or larger than a value obtained by subtracting electric power generated by executing control for stopping engine 100 from charging power limit value Win, a determination is made that the braking force generated as a result of regenerative braking by second MG 120 is equal to or larger than the predetermined value. The electric power generated by executing control for stopping engine 100 is preliminarily measured by a developer based on experiments, simulations and the like, for example.

Figure 17:
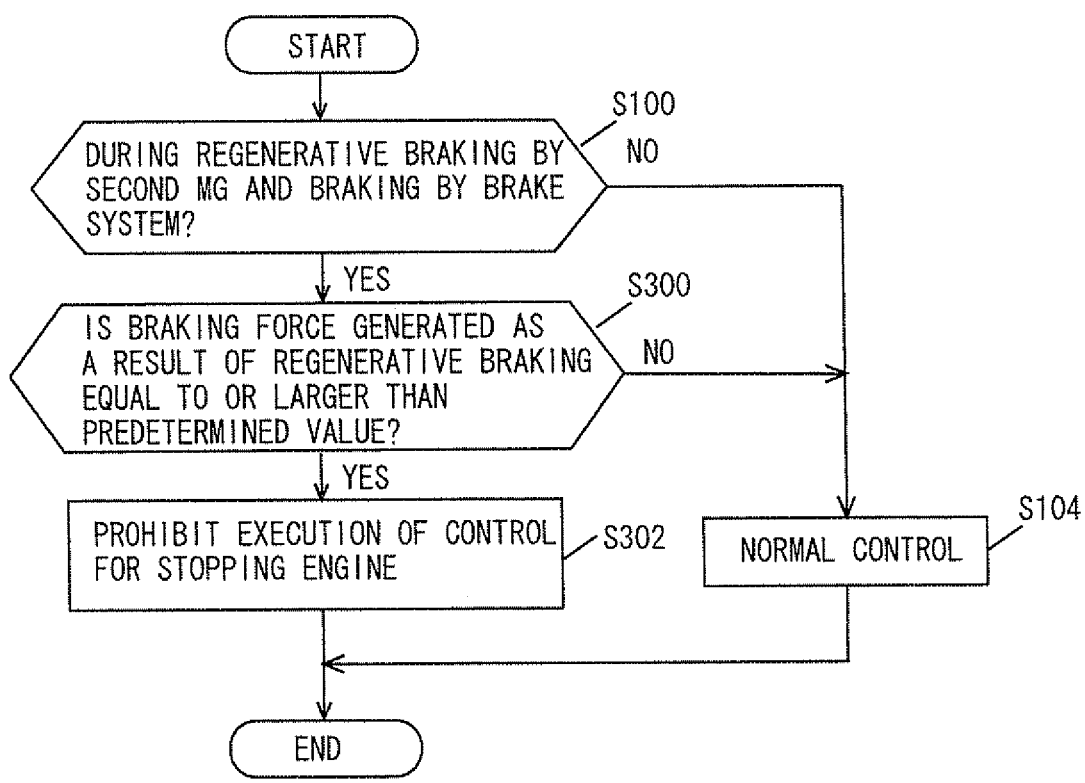
FIG. 17 is a flowchart showing a control structure of the ECU in the third embodiment.

Referring to FIG. 17, a process by ECU 170 will be described. It should be noted that the process described below is repeatedly executed at a predetermined cycle. The same steps as those in the first embodiment are denoted by the same step numbers, and thus, they will not be described in detail repeatedly here.

In S300, ECU 170 determines whether or not the braking force generated as a result of regenerative braking by second MG 120 is equal to or larger than the predetermined value. If the braking force generated as a result of regenerative braking by second MG 120 is equal to or larger than the predetermined value (YES in S300), the process proceeds to S302. If not (NO in S300), the process proceeds to S104.

In S302, ECU 170 prohibits control for stopping engine 100. It should be noted that ECU 170 may prohibit control for starting engine 100, in addition to control for stopping engine 100.

As described above, in the present embodiment, when the braking force generated as a result of regenerative braking is equal to or larger than the predetermined value during execution of control for decelerating the vehicle through regenerative braking by second MG 120 and braking by brake system 300, execution of control for stopping engine 100 is prohibited. When the braking force generated as a result of regenerative braking is smaller than the predetermined value, execution of control for stopping engine 100 is permitted. As a result, the electric power generated in the hybrid vehicle cannot easily become larger than a maximum value of the electric power with which battery 150 can be charged. Therefore, reducing the regeneratively generated electric power is not necessary. As a result, fluctuations in the braking force can be prevented.

Fourth Embodiment

A fourth embodiment will be described hereinafter. In the present embodiment, during execution of control for starting or stopping engine 100, execution of control for decelerating the vehicle through regenerative braking by second MG 120 and braking by brake system 300 is restricted.

Figure 18:
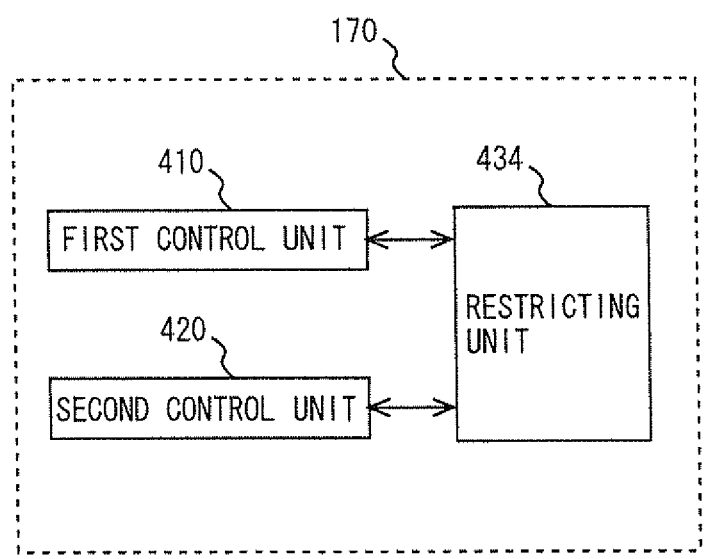
FIG. 18 is a functional block diagram of the ECU in a fourth embodiment.

Referring to FIG. 18, functions of ECU 170 will be described. It should be noted that the functions described below may be implemented by software or may be implemented by hardware. First control unit 410 and second control unit 420 are the same as those in the first embodiment described above, and thus, they will not be described in detail repeatedly here.

Due to execution of one control of control by first control unit 410 and control by second control unit 420, a restricting unit 434 restricts execution of the other control. In the present embodiment, during execution of control by second control unit 420, execution of control by first control unit 410 is prohibited. In other words, during execution of control for starting or stopping engine 100, execution of control for decelerating the vehicle through regenerative braking by second MG 120 and braking by brake system 300 is prohibited.

Figure 19:
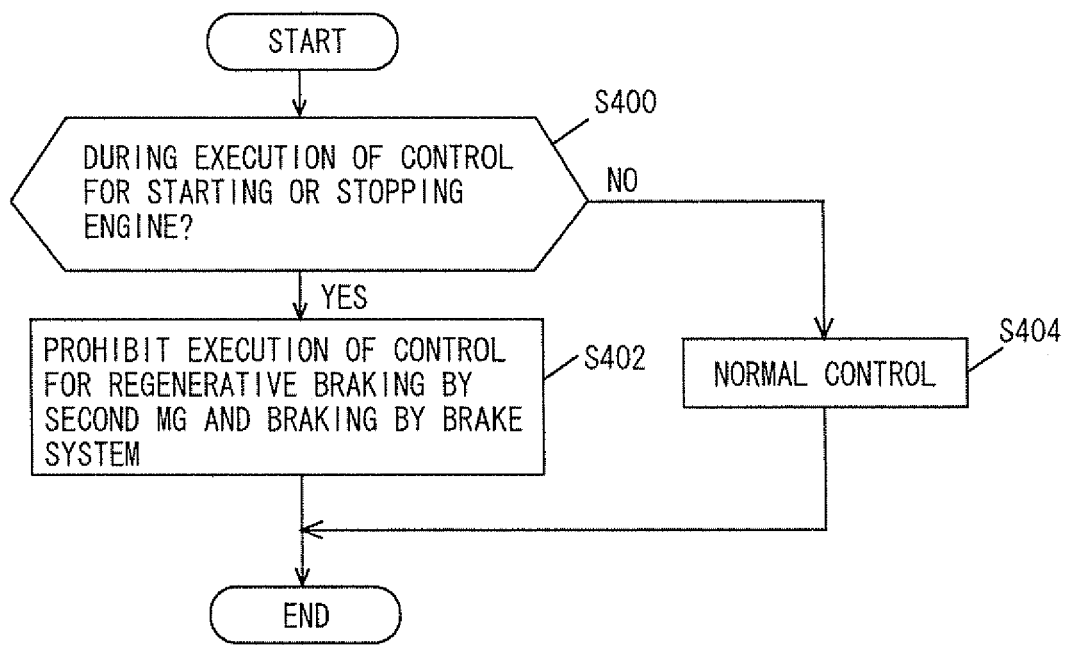
FIG. 19 is a flowchart showing a control structure of the ECU in the fourth embodiment.

Referring to FIG. 19, a process by ECU 170 will be described. It should be noted that the process described below is repeatedly executed at a predetermined cycle.

In S400, ECU 170 determines whether or not control for either starting or stopping engine 100 is being executed. If control for either starting or stopping engine 100 is being executed (YES in S400), the process proceeds to S402. If not (NO in S400), the process proceeds to S404.

In S402, ECU 170 prohibits control for decelerating the vehicle through regenerative braking by second MG 120 and braking by brake system 300. In S404, ECU 170 executes normal control. In other words, ECU 170 permits execution of control for decelerating the vehicle through regenerative braking by second MG 120 and braking by brake system 300. Therefore, the braking force generated as a result of regenerative braking by second MG 120 and the braking force generated by brake system 300 are controlled in accordance with the amount of operation of brake pedal 302.

As described above, in the present embodiment, during execution of control for starting or stopping engine 100, execution of control for decelerating the vehicle through regenerative braking by second MG 120 and braking by brake system 300 is prohibited. As a result, fluctuations in the braking force caused by startup or stop of engine 100 can be prevented. Therefore, the behavior of the vehicle can be stabilized.

Fifth Embodiment

A fifth embodiment will be described hereinafter. In the present embodiment, when control for starting or stopping engine 100 is executed during execution of control for decelerating the vehicle through regenerative braking by second MG 120 and braking by brake system 300, the braking force generated as a result of regenerative braking is reduced at a predetermined change rate before executing control for starting or stopping engine 100.

Figure 20:
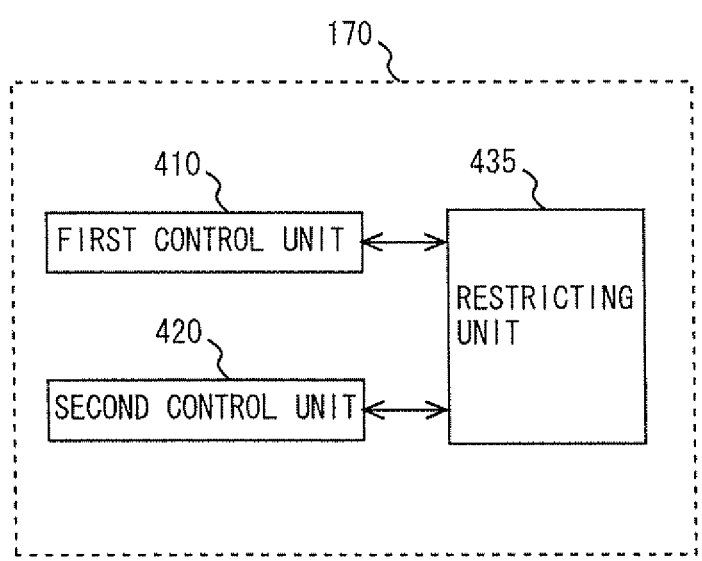
FIG. 20 is a functional block diagram of the ECU in a fifth embodiment.

Referring to FIG. 20, functions of ECU 170 will be described. It should be noted that the functions described below may be implemented by software or may be implemented by hardware. First control unit 410 and second control unit 420 are the same as those in the first embodiment described above, and thus, they will not be described in detailed repeatedly here.

Due to execution of one control of control by first control unit 410 and control by second control unit 420, a restricting unit 435 restricts execution of the other control. In the present embodiment, when control for starting or stopping engine 100 is executed during execution of control for decelerating the vehicle through regenerative braking by second MG 120 and braking by brake system 300, the braking force generated as a result of regenerative braking is reduced at the predetermined change rate before executing control for starting or stopping engine 100.

The change rate of the braking force generated as a result of regenerative braking is defined by a developer within a range of a change rate of the braking force that can be implemented by brake system 300, based on results of experiments, simulations and the like, for example.

Figure 21:
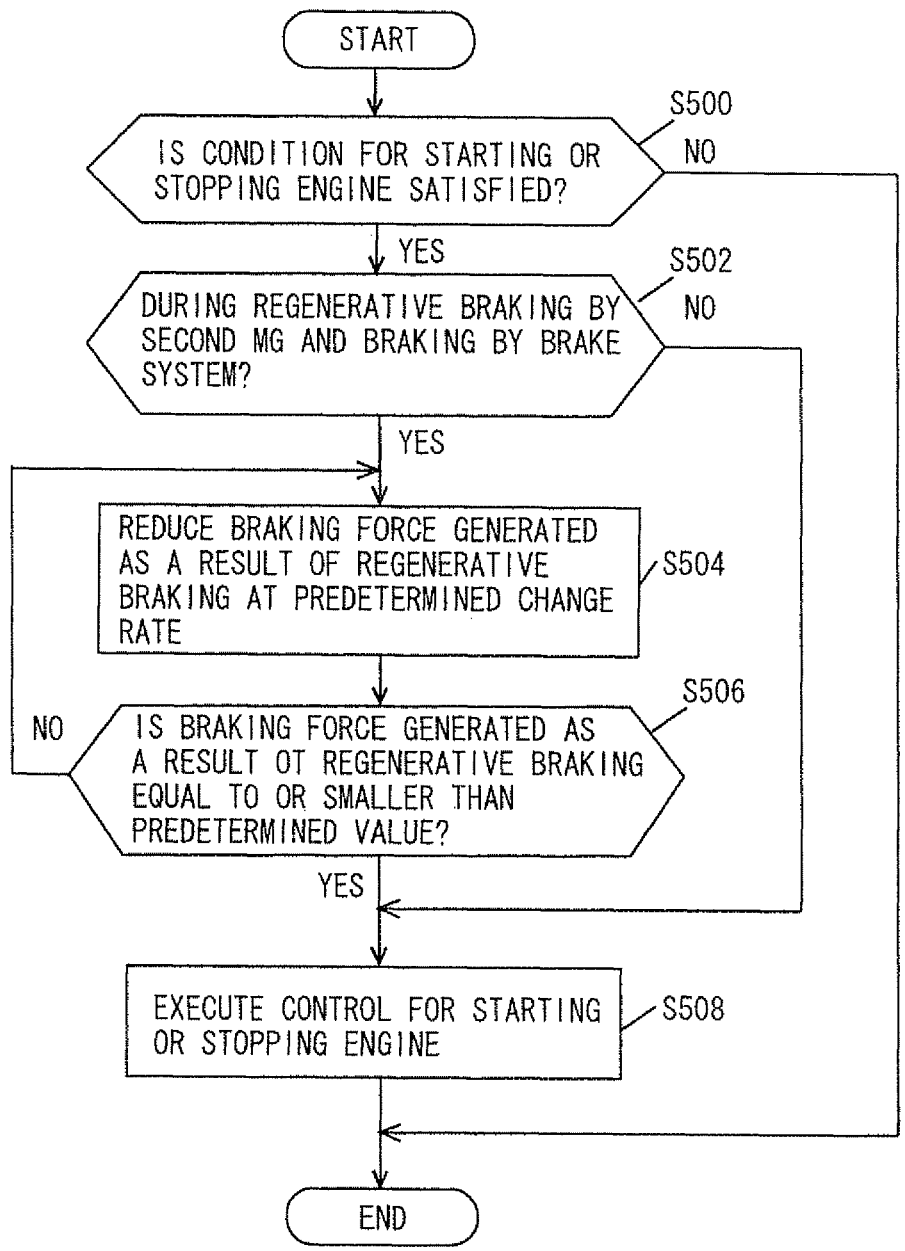
FIG. 21 is a flowchart showing a control structure of the ECU in the fifth embodiment.

Referring to FIG. 21, a process by ECU 170 will be described. It should be noted that the process described below is repeatedly executed at a predetermined cycle.

In S500, ECU 170 determines whether or not a condition for starting engine 100 or a condition for stopping engine 100 is satisfied. If the condition for starting engine 100 or the condition for stopping engine 100 is satisfied (YES in S500), the process proceeds to S502. If not (NO in S500), this process ends.

In S502, ECU 170 determines whether or not control for decelerating the vehicle through regenerative braking by second MG 120 and braking by brake system 300 is being executed. If control for decelerating the vehicle through regenerative braking by second MG 120 and braking by brake system 300 is being executed (YES in S502), the process proceeds to S504. If not (NO in S502), the process proceeds to S508.

In S504, ECU 170 reduces the braking force generated as a result of regenerative braking by second MG 120 at the predetermined change rate.

In S506, ECU 170 determines whether or not the braking force generated as a result of regenerative braking by second MG 120 is equal to or smaller than a predetermined value. For example, when the electric power regeneratively generated by second MG 120 is equal to or smaller than a threshold value, a determination is made that the braking force generated as a result of regenerative braking by second MG 120 is equal to or smaller than the predetermined value.

If the braking force generated as a result of regenerative braking by second MG 120 is equal to or smaller than the predetermined value (YES in S506), the process proceeds to S508. If not (NO in S506), the process returns to S504.

In S508, ECU 170 executes control for either starting or stopping engine 100. Therefore, engine 100 starts or stops. When the condition for starting engine 100 is satisfied, engine 100 starts. When the condition for stopping engine 100 is satisfied, engine 100 stops.

As described above, in the present embodiment, when control for starting or stopping engine 100 is executed during execution of control for decelerating the vehicle through regenerative braking by second MG 120 and braking by brake system 300, the braking force generated as a result of regenerative braking is reduced at the predetermined change rate before executing control for starting or stopping engine 100. As a result, engine 100 can start or stop under the situation in which fluctuations in the braking force generated by brake system 300 can offset fluctuations in the braking force generated as a result of regenerative braking. As a result, even when the regeneratively generated electric power, i.e., the braking force generated as a result of regenerative braking fluctuates, the amount of fluctuations in the braking force of the entire vehicle can be decreased and the behavior of the vehicle can be stabilized.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

100 engine; 110 first MG; 120 second MG; 130 power split device; 140 speed reducer; 150 battery; 160 front wheel; 170 ECU; 200 converter; 210 first inverter; 220 second inverter; 230 DC/DC converter; 240 auxiliary battery; 242 auxiliary device; 250 SMR; 300 brake system; 302 brake pedal; 304 master cylinder; 306 brake actuator; 307, 308 pump; 311 caliper; 410 first control unit; 420 second control unit; 431, 432, 433, 434, 435 restricting unit

The invention claimed is:

1. A vehicle, comprising:
   a power split device constituted by a planetary gear including a sun gear, a pinion gear, a carrier, and a ring gear;
   an engine coupled to said carrier;
   an electric motor coupled to said ring gear and provided such that torque is transmitted between said electric motor and a wheel;
   a braking device that applies braking force to the vehicle via friction force; and
   a control unit that controls said engine, said electric motor and said braking device,
   said control unit
   executing first control for decelerating the vehicle through regenerative braking by said electric motor and braking by said braking device,
   executing second control for either starting or stopping said engine, and
   prohibiting execution of said first control during execution of said second control.

2. The vehicle according to claim 1, wherein
   said control unit prohibits execution of said second control during execution of said first control.

3. The vehicle according to claim 1, wherein
   said control unit
   executes said second control when a predetermined first condition is satisfied and when a second condition different from said first condition is satisfied,
   prohibits execution of said second control when said first condition is satisfied during execution of said first control, and
   executes said second control when said second condition is satisfied during execution of said first control.

4. The vehicle according to claim 1, wherein
   said control unit prohibits execution of said second control when braking force generated as a result of regenerative braking is larger than a predetermined value during execution of said first control.

5. The vehicle according to claim 1, wherein
   when executing said second control during execution of said first control, said control unit reduces braking force generated as a result of regenerative braking at a predetermined change rate before executing said second control.

6. A control method for a vehicle including a power split device constituted by a planetary gear including a sun gear, a pinion gear, a carrier, and a ring gear, an engine coupled to said carrier, an electric motor coupled to said ring gear and provided such that driving power is transmitted between said electric motor and a wheel, and a braking device that applies braking force to the vehicle via friction force, the control method comprising the steps of:
   executing first control for decelerating the vehicle through regenerative braking by said electric motor and braking by said braking device;
   executing second control for either starting or stopping said engine; and
   prohibiting execution of said first control during execution of said second control.

7. A control apparatus for a vehicle including a power split device constituted by a planetary gear including a sun gear, a pinion gear, a carrier, and a ring gear, an engine coupled to said carrier, an electric motor coupled to said ring gear and provided such that driving power is transmitted between said electric motor and a wheel, and a braking device that applies braking force to the vehicle via friction force, the control apparatus comprising:
   means for executing first control for decelerating the vehicle through regenerative braking by said electric motor and braking by said braking device;
   means for executing second control for either starting or stopping said engine; and
   means for prohibiting execution of said first control during execution of said second control.

* * * * *

UNITED STATES PATENT AND TRADEMARK OFFICE
CERTIFICATE OF CORRECTION

PATENT NO. : 8,577,532 B2  
APPLICATION NO. : 13/395760  
DATED : November 5, 2013  
INVENTOR(S) : Koichiro Muta Page 1 of 1

It is certified that error appears in the above-identified patent and that said Letters Patent is hereby corrected as shown below:

On the Title Page, please correct the Assignee's address so that it appears on the Patent as follows:

~~Tokyo (JP)~~ Toyota-shi (JP)

Signed and Sealed this  
Thirteenth Day of May, 2014

Michelle K. Lee  
*Deputy Director of the United States Patent and Trademark Office*